(12) United States Patent
Feng et al.

(10) Patent No.: US 12,092,931 B2
(45) Date of Patent: Sep. 17, 2024

(54) LIQUID CRYSTAL DISPLAY PANEL AND LIQUID CRYSTAL DISPLAY

(71) Applicant: Shenzhen China Star Optoelectronics Semiconductor Display Technology Co., Ltd., Guangdong (CN)

(72) Inventors: Zhengyu Feng, Guangdong (CN); Lei Wen, Guangdong (CN); Jiangbo Yao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/424,212

(22) PCT Filed: Jun. 23, 2021

(86) PCT No.: PCT/CN2021/101700
§ 371 (c)(1),
(2) Date: Jul. 20, 2021

(87) PCT Pub. No.: WO2022/217744
PCT Pub. Date: Oct. 20, 2022

(65) Prior Publication Data
US 2024/0027848 A1    Jan. 25, 2024

(30) Foreign Application Priority Data
Apr. 16, 2021 (CN) .......................... 202110410355.8

(51) Int. Cl.
G02F 1/1343 (2006.01)
G02F 1/1335 (2006.01)

(52) U.S. Cl.
CPC .. *G02F 1/134345* (2021.01); *G02F 1/133512* (2013.01); *G02F 1/133514* (2013.01)

(58) Field of Classification Search
None
See application file for complete search history.

(56) References Cited

U.S. PATENT DOCUMENTS

| 2017/0285418 | A1 |   | 10/2017 | Tanaka et al. |
| 2021/0233970 | A1 | * | 7/2021  | Wang ................. H10K 59/353 |
| 2021/0407445 | A1 | * | 12/2021 | Wang ................. G09G 3/3648 |

FOREIGN PATENT DOCUMENTS

| CN | 104777666   |   | 7/2015  |                  |
| CN | 109856850   |   | 6/2019  |                  |
| CN | 109856850 A | * | 6/2019  |                  |
| CN | 110543050   |   | 12/2019 |                  |
| CN | 110570774   |   | 12/2019 |                  |
| CN | 110676301   |   | 1/2020  |                  |
| CN | 111708230   |   | 9/2020  |                  |
| CN | 112365807   |   | 2/2021  |                  |
| CN | 112365807 A | * | 2/2021  | ......... G02F 1/13338 |
| CN | 112562569 A | * | 3/2021  | ........... G09G 3/2074 |

* cited by examiner

*Primary Examiner* — Shan Liu

(57) ABSTRACT

A liquid crystal display panel includes a first display area, a second display area, and sub-pixels. The sub-pixels are arranged in an array. The sub-pixels comprise a first sub-pixel and a second sub-pixel. The first sub-pixel is disposed in the first display area, the second sub-pixel is disposed in the second display area, and thickness of photoresist of at least a part of the second sub-pixel is smaller than the thickness of the photoresist of the first sub-pixel. A liquid crystal display is also provided.

16 Claims, 7 Drawing Sheets

LIQUID CRYSTAL DISPLAY PANEL AND LIQUID CRYSTAL DISPLAY

RELATED APPLICATIONS

This application is a National Phase of PCT Patent Application No. PCT/CN2021/101700 having International filing date of Jun. 23, 2021, which claims the benefit of priority of Chinese Patent Application No. 202110410355.8 filed on Apr. 16, 2021. The contents of the above applications are all incorporated by reference as if fully set forth herein in their entirety.

FIELD AND BACKGROUND OF THE INVENTION

The present disclosure relates to a field of display technology, and more particularly to a liquid crystal display panel and a liquid crystal display.

With continuous development of electronic technology, cameras are widely applied in various electronic devices. However, inconsistency between a camera and surrounding appearance is easy to be observed, which greatly affects aesthetics of the electronic devices. In order to solve this problem, an under-screen camera emerges as the times require. The under-screen camera is disposed under a liquid crystal display (LCD). The under-screen camera can greatly improve the aesthetics of the electronic devices. A transmittance of conventional liquid crystal displays is relatively low, diffraction caused by the periodic arrangement of the liquid crystal greatly affects image quality of a display panel corresponding to the under-screen camera.

SUMMARY OF THE INVENTION

The present disclosure provides a liquid crystal display panel and a liquid crystal display, which can improve a transmittance of the liquid crystal display, and can improve the image quality of the display panel corresponding to the under-screen camera.

In order to solve the above technical problem, the present disclosure provides the following technical solutions:

An aspect of the present disclosure provides a liquid crystal display panel, the liquid crystal display panel includes a first display area and a second display area. The liquid crystal display panel further includes:
  sub-pixels arranged in an array, wherein the sub-pixels comprise a first sub-pixel and a second sub-pixel.
  the first sub-pixel is disposed in the first display area, the second sub-pixel is disposed in the second display area, and a thickness of photoresist of at least a part of the second sub-pixel is smaller than a thickness of the photoresist of the first sub-pixel.

In an alternative embodiment of the present disclosure, the photoresist of the second sub-pixels has a same thickness.

In an alternative embodiment of the present disclosure, the second sub-pixel comprises a photoresist area and a light-transmitting area, and a thickness of the photoresist in the light-transmitting area is 0.

In an alternative embodiment of the present disclosure, a thickness of the photoresist in the photoresist area is smaller than or equal to a thickness of the photoresist of the first sub-pixel.

In an alternative embodiment of the present disclosure, a R sub-pixel, G sub-pixel or B sub-pixel is formed in the photoresist area, a W sub-pixel is formed in the light-transmitting area, and a sub-pixel formed in the photoresist area and a sub-pixel formed in the light-transmitting area at a same second sub-pixel are controlled by a same data signal.

In an alternative embodiment of the present disclosure, the sub-pixels are arranged in the array to form pixel rows and pixel columns, the pixel rows correspond to a first direction, the pixel columns correspond to a second direction, and the photoresist area and the light-transmitting area are adjoining to each other along the second direction.

In an alternative embodiment of the present disclosure, a thickness of the photoresist in the second sub-pixel is 0.

In an alternative embodiment of the present disclosure, a density of the second sub-pixel is smaller than a density of the first sub-pixel.

In an alternative embodiment of the present disclosure, an area of each of the second sub-pixel is greater than an area of each of the first sub-pixel.

A second aspect of the present disclosure provides a liquid crystal display, the liquid crystal display includes:
  liquid crystal display panel described above.
  Optical assembly disposed under the liquid crystal display, and the optical assembly is opposite to the second display area.

A liquid crystal display panel provided by the present disclosure includes a first display area and a second display area arranged to adjoin the first display area, and a camera is arranged corresponding to at least a part of the second display area. By reducing a thickness of a second photoresist in part of the second display area to be smaller than a thickness of a first photoresist in the first display area, a transmittance of the liquid crystal display panel at the corresponding position of the camera and the image quality of the under-screen camera are improved.

BRIEF DESCRIPTION OF THE SEVERAL VIEWS OF THE DRAWINGS

The embodiments of the present disclosure will be described hereinafter with reference to the accompanying drawings, the technical solutions and the beneficial effects of the present disclosure will be obviously.

DESCRIPTION OF THE SPECIFIC EMBODIMENTS OF THE INVENTION

Figure 1:
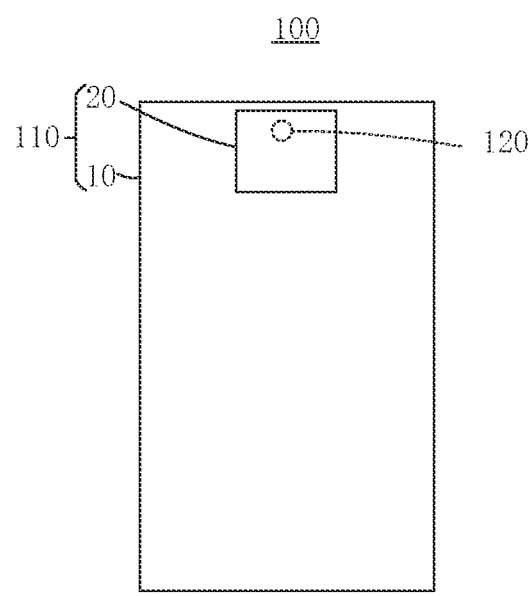
FIG. 1 is a schematic diagram of a liquid crystal display provided by an preferred embodiment of the present disclosure.

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

In the descriptions of the present disclosure, the terms "upper", "lower", directions, and other indicated directions or the position relation are based on the orientation or position relation shown in the figures. Only for convenience of describing the present disclosure and the simplification of the description, rather than indicating or implying that the means or elements referred to have a specific orientation, so that the above directions of the present disclosure cannot be understood as limitations. In addition, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features. In the description of the present disclosure, the meanings of "multiple" are two or more, unless specifically limited otherwise.

In addition, reference numerals and/or reference letters can be repeated in different examples, and such repetition is for the purpose of simplicity and clarity, and is not intended to indicate the relationship between the various embodiments and/or arrangements discussed.

A transmittance of conventional liquid crystal displays is relatively low, diffraction caused by the periodic arrangement of the liquid crystal greatly affects image quality of under-screen camera. In order to solve this problem, in the present disclosure, a liquid crystal display panel provided by the present disclosure includes a first display area and a second display area arranged to adjoin the first display area, and a camera is arranged corresponding to the second display area. By reducing a thickness of a second photoresist in part of the second display area to be smaller than the a thickness of a first photoresist in the first display area, the transmittance of the liquid crystal display panel at the corresponding position of the camera and the image quality of the under-screen camera are improved.

Hereinafter, the liquid crystal display panel and the liquid crystal display of the present disclosure will be described in detail with reference to specific embodiments.

Figure 2:
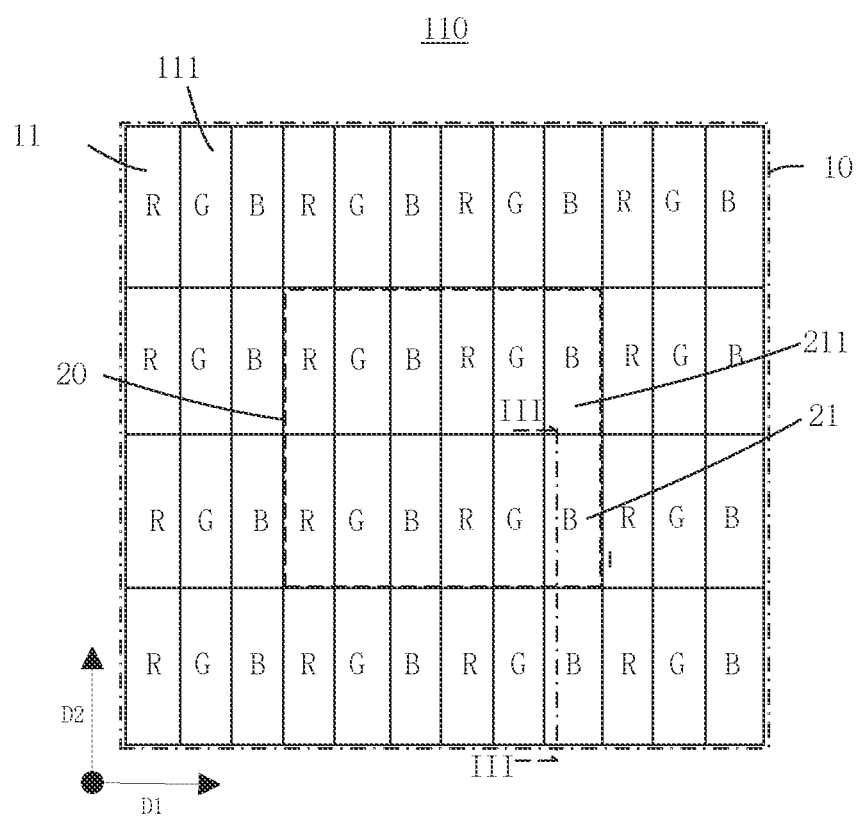
FIG. 2 is a schematic diagram of a pixel structure of the liquid crystal display provided by a first embodiment of the present disclosure.
Figure 3:
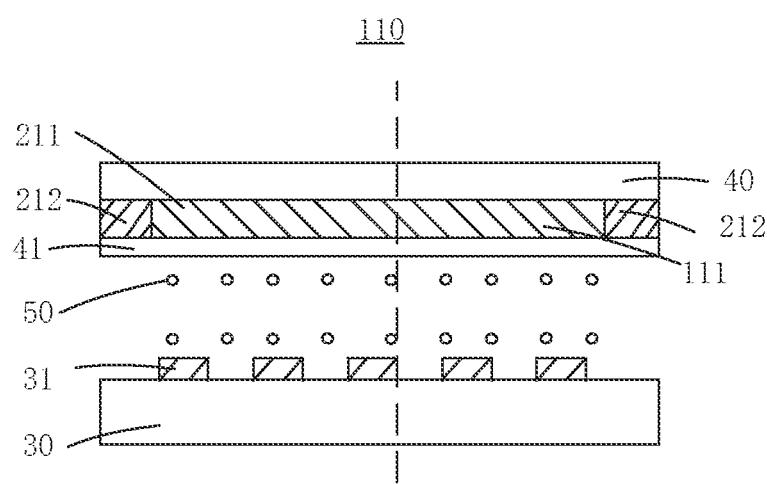
FIG. 3 is a schematic cross-sectional diagram taken along the line III-III shown in FIG. 2.

Referring to FIG. 1 to FIG. 3, a liquid crystal display 100 in a first embodiment of the present disclosure is provided. The liquid crystal display 100 includes a liquid crystal display panel 110, an optical assembly 120 disposed under the liquid crystal display 100, and a backlight panel (not shown in FIGs) disposed under the liquid crystal display 100.

In an alternative embodiment of the present disclosure, the optical assembly 120 is arranged between the backlight panel and the liquid crystal display panel 110, or the optical assembly 120 is arranged on the backlight panel, or is arranged in the backlight panel.

In an alternative embodiment of the present disclosure, the optical assembly 120 is a camera.

The liquid crystal display panel 110 includes a first display area 10 and a second display area 20 adjoining to the first display area 10. The optical assembly 120 is opposite to the second display area 20.

The first display area 10 is a normal display area, and the second display area 20 is a camera display area.

Referring to FIG. 1, in this embodiment, the liquid crystal display panel 110 includes the first display area 10 and the second display area 20, the second display area 20 is surrounded by the first display area 10, and the second display area 20 is located above the first display area 10.

In other embodiments, the number of the second display area 20 may be more than one, and the second display area 2 may also be located in the first display area 10. The number and position of the second display area 20 can be determined according to the number and position of cameras.

Specifically, referring to FIG. 2, the liquid crystal display panel 110 further includes sub-pixels arranged in an array, and the sub-pixels include a first sub-pixel 11 and a second sub-pixel 21. Each first sub-pixel 11 includes a first photoresist 111. Each second sub-pixel 21 includes a second photoresist 211. A thickness of at least a part of the second photoresist 211 is smaller than a thickness of the first photoresist 111, so as to improve the transmittance of the second display area 20 and the image quality of the display panel corresponding to the under-screen camera.

The sub-pixels are arranged in the array to form pixel rows and pixel columns, the pixel rows correspond to a first direction D1, the pixel columns correspond to a second direction D2.

The first sub-pixel 11 includes a R sub-pixel, G sub-pixel or B sub-pixel. The first sub-pixel 11 constitutes a first pixel unit according to a standard RGB arrangement or an RGB PenTile arrangement. It is understood that pixels in the standard RGB arrangement are composed of three pixels: "red, green and blue", while pixels in the RGB PenTile arrangement are composed of two pixels: "red and green" or "blue and green".

The first photoresist 111 includes but is not limited to one of a R photoresist, a G photoresist or a B photoresist. First photoresist 111 is arranged in standard RGB arrangement or RGB PenTile arrangement, etc. When light pass through the first photoresist 111, the first sub-pixel 11 emits light of a same color as the first photoresist 111.

In this embodiment, the second sub-pixel 21 includes but is not limited to a R sub-pixel, G sub-pixel or B sub-pixel. The second sub-pixel 21 constitutes a second pixel unit according to a standard RGB arrangement or an RGB PenTile arrangement. In this embodiment, the first pixel unit surrounds the second pixel unit.

In this embodiment, the second photoresist 211 has a same/constant thickness, and a thickness of the second photoresist 211 is smaller than a thickness of the first photoresist 111.

In another alternative embodiment of the present disclosure, a size of one second sub-pixel 21 at least in the first direction D1 or the second direction D2 is larger than a size of one first sub-pixel 11, so as to reduce number of the second sub-pixel 21, thereby reducing an area of a non-transmissive area such as a black matrix or a metal wire in the liquid crystal display panel 110, and improving the transmittance of the second display area 20 of the liquid crystal display panel 110 and the image quality of the display panel corresponding to the under-screen camera.

In another alternative embodiment of the present disclosure, a density of the second sub-pixel 21 is smaller than a density of the first sub-pixel 11, so as to increase the transmittance of the second display area 20 of the liquid crystal display panel 110 and improve the image quality of the display panel corresponding to the under-screen camera. Specifically, an area of each second sub-pixel 21 is larger than an area of each first sub-pixel 11.

In still another alternative embodiment of the present disclosure, there is a black matrix 212 between two adjoining second photoresists 211 and between two adjoining first photoresists 111 (shown in FIG. 3). An area of the black matrix between two adjoining second photoresists 211 is smaller than an area of the black matrix between two adjoining first photoresists 111, so as to increase the transmittance of the second display area 20 of the liquid crystal display panel 110 and improve the image quality of the display panel corresponding to the under-screen camera.

In this embodiment, a halftone raster photomask is used to develop the second photoresist 211. A thickness of photoresists in different areas is controlled by controlling the exposure quantity, so that the thickness of the second photoresist 211 in the second display area 20 is smaller than the thickness of the first photoresist 111 in the first display area 10.

Referring to FIG. 3, the liquid crystal display panel 110 further includes an array substrate 30, a color filter substrate 40 and a liquid crystal 50 disposed on the array substrate 30. A pixel electrode 31 is formed on the array substrate 30, and the pixel electrode 31 faces the liquid crystal 50. A common electrode 41 is formed on the color filter substrate 40. There is a voltage difference between the common electrode 41 and the pixel electrode 31, and the voltage difference can drive the liquid crystal 50 to deflect. The first photoresist 111 and the second photoresist 211 are formed on the color filter substrate 40. The black matrix 212 is provided between two adjoining first photoresists 111 and two adjoining second photoresists 211, and the black matrix 212 can separate two adjoining first photoresists 111 and two adjoining second photoresists 211. The common electrode 41 is formed on the black matrix 212, the first photoresist 111 and the second photoresist 211. The common electrode 41 faces the liquid crystal 50. A polarizer (not shown in FIGs) is formed on a surface of the color filter substrate away from the liquid crystal 50, and a planarization layer (not shown in FIGs) is also formed on the common electrode 41.

When the liquid crystal display panel 110 is in a imaging state, the second sub-pixel 21 is turned on, and a gray scale of the second sub-pixel 21 is displayed as 255. The transmittance of the second display area 20 of the liquid crystal display panel 110 reaches the maximum. Since the thickness of the second photoresist 211 is relatively small, when the transmittance of the second display area 20 of the liquid crystal display panel 110 increases, the image quality of the under-screen camera will be improved.

Figure 4:
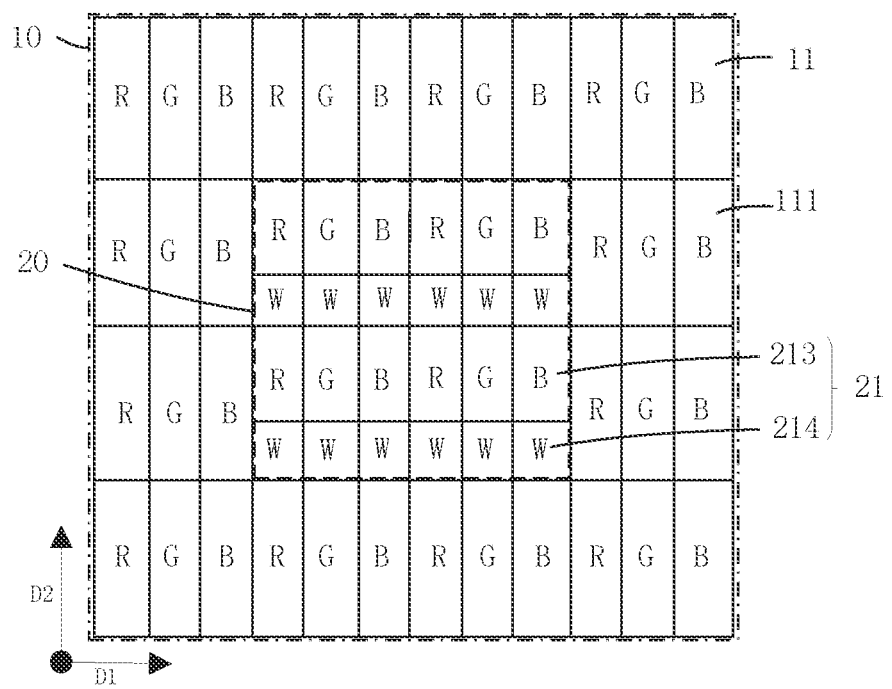
FIG. 4 is a schematic diagram of the pixel structure of the liquid crystal display provided by a second embodiment of the present disclosure.

Referring to FIG. 4, the second embodiment of the present disclosure provides a liquid crystal display panel 130, and structure of the liquid crystal display panel 130 is similar to the structure of the liquid crystal display panel 110. The only difference is that the second sub-pixel 21 includes a photoresist area 213 and a light-transmitting area 214, and the light-transmitting area 214 and the photoresist area 213 are adjoining in the second direction D2. A thickness of the second photoresist 211 in the photoresist area 213 is smaller than or equal to the thickness of the first photoresist 111, and the thickness of the photoresist of the light-transmitting area 214 is equal to 0.

The material of the light-transmitting area 214 of the second sub-pixel 21 may be a light-transmitting material such as optical transparent glue.

Wherein, a R sub-pixel, G sub-pixel or B sub-pixel is formed in the photoresist area 21, a W sub-pixel is formed in the light-transmitting area 214, and a sub-pixel formed in the photoresist area 213 and the sub-pixel formed in the light-transmitting area 214 at a same second sub-pixel 21 are controlled by a same data signal.

In this embodiment, one second sub-pixel 21 includes one photoresist area 213 and one light-transmitting area 214.

Wherein, when the liquid crystal display panel 130 is in a normal display state, the second sub-pixel 21 is driven by the data signal to be turned on, and displays different brightness. When the liquid crystal display panel 110 is in the imaging state, the second sub-pixel 21 is turned on, and the gray scale of the second sub-pixel 21 is displayed as 255. The transmittance of the second display area 20 of the liquid crystal display panel 110 reaches the maximum.

A white sub-pixel is added to the second sub-pixel 21 of the display panel 130, so as to improve the transmittance of the second display area 20 of the liquid crystal display panel 140 and the image quality of the display panel corresponding to the under-screen camera.

Figure 5:
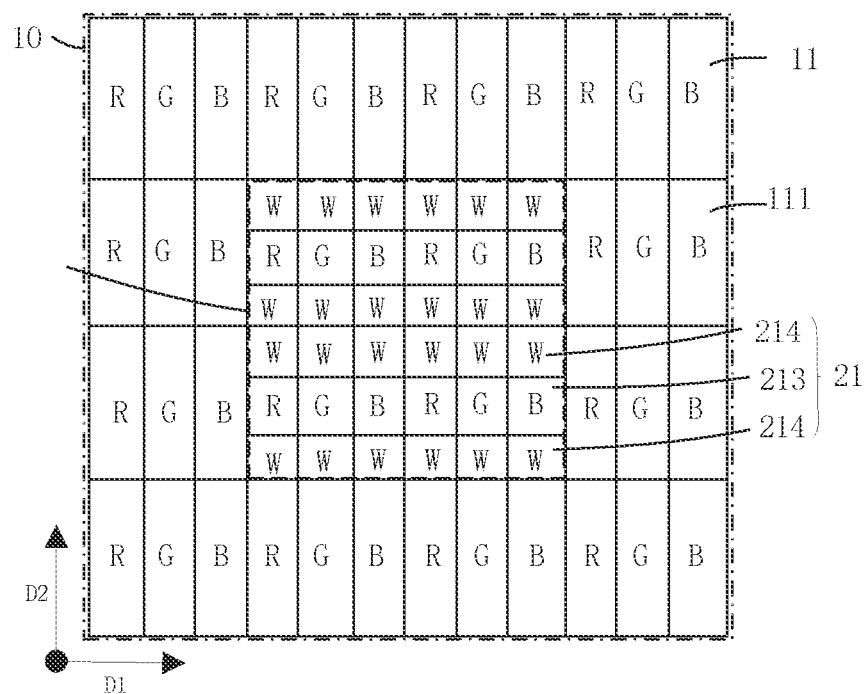
FIG. 5 is a schematic diagram of the pixel structure of the liquid crystal display provided by a third embodiment of the present disclosure.

Referring to FIG. 5, the third embodiment of the present disclosure provides a liquid crystal display panel 140, and structure of the liquid crystal display panel 140 is similar to the structure of the liquid crystal display panel 130. The only difference is that the second sub-pixel 21 includes one photoresist area 213 and two light-transmitting areas 214, and the photoresist area 213 is located between the two light-transmitting areas 214.

In the liquid crystal display panel 140 provided by the present disclosure, the second sub-pixel 21 located in the second display area includes two light-transmitting areas 214. That is to say, number of W sub-pixels in the second sub-pixel 21 located in the second display area of the liquid crystal display panel 140 is increased. Therefore, the transmittance of the second display area 20 of the liquid crystal display panel 140 and the image quality of the under-screen camera are further improved.

Figure 6:
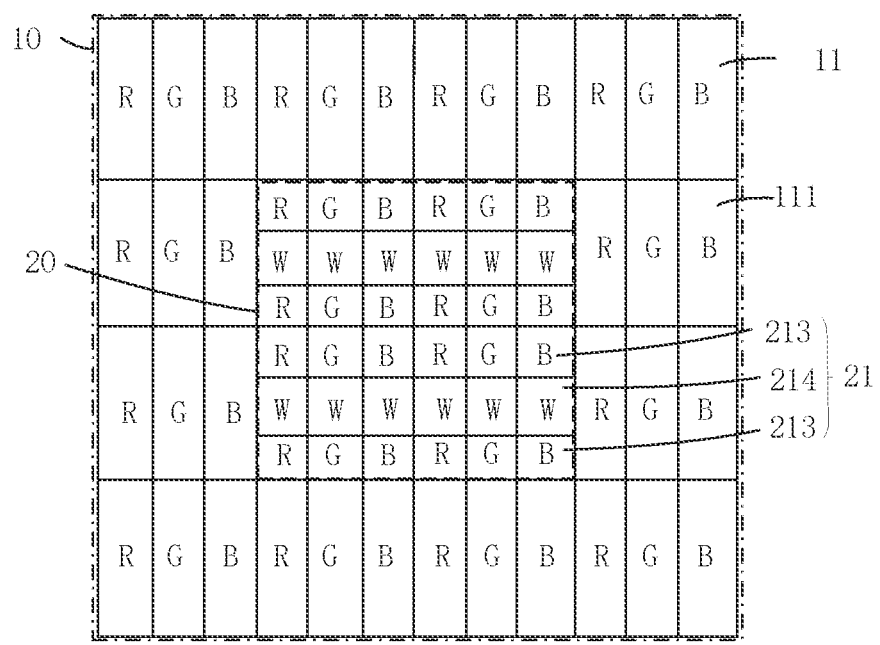
FIG. 6 is a schematic diagram of the pixel structure of the liquid crystal display provided by a fourth embodiment of the present disclosure.

Referring to FIG. 6, the fourth embodiment of the present disclosure provides a liquid crystal display panel 150, and structure of the liquid crystal display panel 150 is similar to the structure of the liquid crystal display panel 140. The only difference is that the second sub-pixel 21 includes two photoresist areas 213 and one light-transmitting area 214, and the light-transmitting area 214 is located between the two photoresist areas 213.

Of course, in other embodiments, the number of the photoresist area 213 and the light-transmitting area 214 of each second sub-pixel 21 is not limited to above-mentioned number, but can be set according to actual conditions.

Figure 7:
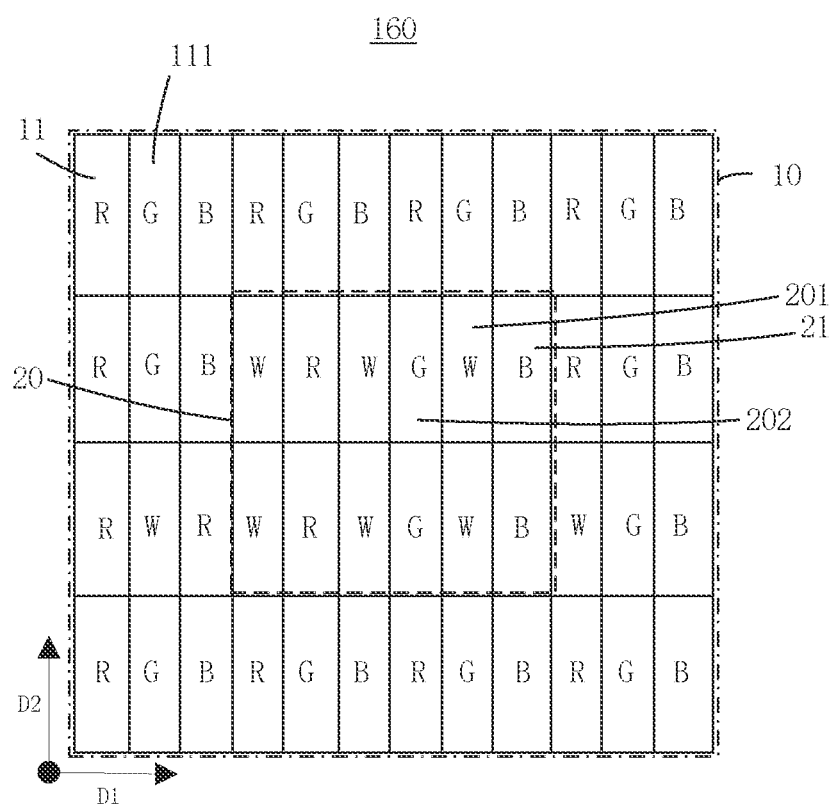
FIG. 7 is a schematic diagram of the pixel structure of the liquid crystal display provided by a fifth embodiment of the present disclosure.

Referring to FIG. 7, the fifth embodiment of the present disclosure provides a liquid crystal display panel 160, and structure of the liquid crystal display panel 160 is similar to the structure of the liquid crystal display panel 110. The only difference is that some of the second sub-pixel 21 are white sub-pixels, and some of the second sub-pixel 21 are R sub-pixels, G sub-pixels, or B sub-pixels. For convenience of explanation, in FIG. 7, the W sub-pixel in the second sub-pixel 21 is denoted by 201, and the R sub-pixel, G sub-pixel, or B sub-pixel in the second sub-pixel 21 is denoted by 202. The white sub-pixel 201 and the R sub-pixel, G sub-pixel, or B sub-pixel 202 are arranged in an RGBW format.

When the liquid crystal display panel 160 is in the normal display state, the W sub-pixel 201 is turned off, and the R sub-pixel, G sub-pixel, or B sub-pixel 202 is turned on and displays, so that the display effect of the camera display area (the second display area 20) is close to that of the normal display area (the first display area 10). When the liquid crystal display panel 160 is in the imaging state, the W sub-pixel 201 and the R sub-pixel, G sub-pixel, or B sub-pixel 202 are all turned on to a gray scale of 255, and the transmittance of the camera display area reaches the maximum. Compared with the RGB pixel arrangement, the transmittance and image quality of the RGBW pixel structure are improved.

The beneficial effects of the present disclosure are as follows: 1) The present invention provides a liquid crystal display panel, by reducing thickness of the photoresist of the second sub-pixel in part of the second display area to be smaller than the thickness of the photoresist of the first sub-pixel in the first display area, the transmittance of the second display area 20 of the liquid crystal display panel and the image quality of the liquid crystal display panel are improved. 2) The white sub-pixel disposed in the second display area 20 can further increase the transmittance of the second display area 20 of the liquid crystal display panel and further improve the image quality of the liquid crystal display panel are improved.

The liquid crystal display panel and liquid crystal display provided by the embodiments of the present disclosure are described in detail above. The descriptions of the above embodiments are only used to help understand the present disclosure technical solutions and their core ideas. Those of ordinary skill in the art should understand that they can still modify the technical solutions described in the foregoing embodiments, or equivalently replace some of the technical features. These modifications or replacements, and the essence of the corresponding technical solutions does not deviate from the scope of the technical solutions of the embodiments of the present application.

What is claimed is:

1. A liquid crystal display panel, comprising:
   a first display area;
   a second display area;
   sub-pixels arranged in an array, wherein the sub-pixels comprise first sub-pixels and second sub-pixels; and
   wherein the first sub-pixels are disposed in the first display area, the second sub-pixels are disposed in the second display area, and a thickness of photoresist of at least a part of the second sub-pixels is smaller than a thickness of the photoresist of the first sub-pixels;
   each of the second sub-pixels comprises at least one photoresist area and at least one light-transmitting area in a second direction, and a thickness of the photoresist in the at least one light-transmitting area is 0; each of the at least one photoresist area and a corresponding one of the at least one light-transmitting area are adjoining to each other and alternatively arranged along the second direction;
   wherein each of the at least one photoresist area has an area greater than the corresponding one of the at least one light-transmitting area; or
   for each of the at least one light-transmitting area, areas of two of the at least one photoresist area which are adjacent to the light-transmitting area are each smaller than an area of the light-transmitting area, and a sum of the areas of the two photoresist areas is greater than the area of the light-transmitting area; and
   wherein a black matrix is arranged between the photoresist of every adjacent two of the second sub-pixels, and another black matrix is arranged between the photoresist of every adjacent two of the first sub-pixels, the black matrix has a smaller area than the another black matrix, and no black matrix is arranged between the photoresist of ones of the second sub-pixels and the photoresist of ones, which are adjacent to the ones of the second sub-pixels, of the first sub-pixels.

2. The liquid crystal display panel of claim 1, wherein the photoresist of the second sub-pixels has a same thickness.

3. The liquid crystal display panel of claim 1, wherein a thickness of the photoresist in the photoresist area is smaller than or equal to a thickness of the photoresist of the first sub-pixels.

4. The liquid crystal display panel of claim 3, wherein a R sub-pixel, G sub-pixel or B sub-pixel is formed in the photoresist area, a W sub-pixel is formed in the light-transmitting area, and a sub-pixel formed in the photoresist area and a sub-pixel formed in the light-transmitting area at a same second sub-pixel of the second sub-pixels are controlled by a same data signal.

5. The liquid crystal display panel of claim 4, wherein the sub-pixels are arranged in the array to form pixel rows and pixel columns, the pixel rows correspond to a first direction, the pixel columns correspond to the second direction.

6. The liquid crystal display panel of claim 1, wherein a R sub-pixel, G sub-pixel or B sub-pixel is formed in the photoresist area, a W sub-pixel is formed in the light-transmitting area, and a sub-pixel formed in the photoresist area and a sub-pixel formed in the light-transmitting area at a same second sub-pixel of the second sub-pixels are controlled by a same data signal.

7. The liquid crystal display panel of claim 6, wherein the sub-pixels are arranged in the array to form pixel rows and pixel columns, the pixel rows correspond to a first direction, the pixel columns correspond to the second direction.

8. The liquid crystal display panel of claim 1, wherein density of the second sub-pixels is smaller than density of the first sub-pixels.

9. The liquid crystal display panel of claim 8, wherein an area of each of the second sub-pixels is greater than an area of each of the first sub-pixels.

10. A liquid crystal display, comprising a liquid crystal display panel, wherein the liquid crystal display panel comprises:
    a first display area;
    a second display area;
    sub-pixels arranged in an array, wherein the sub-pixels comprise first sub- pixels and second sub-pixels; and
    wherein the first sub-pixels are disposed in the first display area, the second sub-pixels are disposed in the second display area, and a thickness of photoresist of at least a part of the second sub-pixels is smaller than a thickness of the photoresist of the first sub-pixels;
    each of the second sub-pixels comprises at least one photoresist area and at least one light-transmitting area in a second direction, and a thickness of the photoresist in the at least one light-transmitting area is 0; each of the at least one photoresist area and a corresponding one of the at least one light-transmitting area are adjoining to each other and alternatively arranged along the second direction;
    wherein each of the at least one photoresist area has an area greater than the corresponding one of the at least one light-transmitting area; or
    for each of the at least one light-transmitting area, areas of two of the at least one photoresist area which are adjacent to the light-transmitting area are each smaller than an area of the light-transmitting area, and a sum of the areas of the two photoresist areas is greater than the area of the light-transmitting area; and
    wherein a black matrix is arranged between the photoresist of every adjacenttwo of the second sub-pixels, and another black matrix is arranged between the photoresist of every adjacent two of the first sub-pixels, the black matrix has a smaller area than the another black matrix, and no black matrix is arranged between the photoresist of ones of the second sub-pixels and the photoresist of ones, which are adjacent to the ones of the second sub-pixels, of the first sub-pixels.

11. The liquid crystal display of claim 10, wherein the photoresist of the second sub-pixels has a same thickness.

12. The liquid crystal display of claim 10, wherein a thickness of the photoresist in the photoresist area is smaller than or equal to a thickness of the photoresist of the first sub-pixels.

13. The liquid crystal display of claim 10, wherein a R sub-pixel, G sub-pixel or B sub-pixel is formed in the photoresist area, a W sub-pixel is formed in the light-transmitting area, and a sub-pixel formed in the photoresist area and a sub-pixel formed in the light-transmitting area at a same second sub-pixel of the second sub-pixels are controlled by a same data signal.

14. The liquid crystal display of claim 13, wherein the sub-pixels are arranged in the array to form pixel rows and pixel columns, the pixel rows correspond to a first direction, the pixel columns correspond to the second direction.

15. The liquid crystal display of claim 10, wherein density of the second sub-pixels is smaller than density of the first sub-pixels.

16. The liquid crystal display of claim 15, wherein an area of each of the second sub-pixels is greater than an area of each of the first sub-pixels.

* * * * *